United States Patent [19]

Chiue et al.

[11] Patent Number: 5,027,389
[45] Date of Patent: Jun. 25, 1991

[54] SELF-COMPENSATED DUAL TONE MULTIPLE FREQUENCY GENERATOR

[75] Inventors: Tzu-Ching Chiue, Taipei; Yarn-Chern Chen, Nan-Tou, both of Taiwan

[73] Assignee: Industrial Technology Research Institute, Taiwan, Taiwan

[21] Appl. No.: 320,720

[22] Filed: Mar. 8, 1989

[30] Foreign Application Priority Data

Aug. 29, 1988 [JP] Japan ................... 63-214757

[51] Int. Cl.⁵ ............................... H04M 1/00
[52] U.S. Cl. ................... 379/361; 379/256; 364/721
[58] Field of Search ............ 323/311; 307/296.1, 307/296.2, 296.3, 296.4, 296.5, 296.6, 296.7, 296.8; 340/38.49; 341/173; 364/721; 379/256, 361

[56] References Cited

U.S. PATENT DOCUMENTS

| | | | |
|---|---|---|---|
| 3,174,095 | 3/1965 | Cocker | 323/311 |
| 4,103,220 | 7/1978 | Huntley | 323/19 |
| 4,639,554 | 1/1987 | Masuda et al. | 379/361 X |

FOREIGN PATENT DOCUMENTS 0121793 10/1984 European Pat. Off. ............ 323/311

OTHER PUBLICATIONS

ERSO Data Book Telecommunication 1988, pp. 87–89 and 61–63.
"Self Stabilizing Voltage Reference", R. Stewart, Technical Notes RCA, TN No. 122, Dec. 29, 1978.

Primary Examiner—Jin F. Ng
Assistant Examiner—Jhancy Augustus
Attorney, Agent, or Firm—Darby & Darby

[57] ABSTRACT

A Dual-Tone Multi-Frequency (DTMF) Generator produces a row and column tone frequency for application to the input of two source follower buffer stages. The outputs of the buffers stages are combined in summation operational amplifier to generate the DTMF Signal. There is a voltage level shift between the input and output terminal of the source followers which can be compensated with a self-compensated circuit. With a perfect match between the compensated signal and the source follower, the operational range of working voltage can be about 1.8V to 5V, and the generator can tolerate threshold voltage variation of the transistors.

12 Claims, 4 Drawing Sheets

SELF-COMPENSATED DUAL TONE MULTIPLE FREQUENCY GENERATOR

BACKGROUND OF THE INVENTION

Pulse signals emitted by conventional rotary dialing switches are often distorted as a result of long transmission distances, and the signals are consequently occasionally incorrectly identified. This erroneous signal phenomenon is known as Wrong-Number Interference. In 1968, CCITT recommended a set of Dual-Tone Multiple-Frequency (DTMF) signals to represent the communication signal between the subscriber and the center station. DTMF systems employ two groups of frequencies each having four distinct frequencies. Using the two groups of frequencies, there are sixteen different combinations of dual tone multiple frequency. Electronic Research and Service Organization (ERSO), a branch of Industrial Technology Research Institute (ITRI), has developed a series of DTMF generators since 1983.

As a result of subscribers' demands, attempts have been made to reduce the working voltage range of DTMF Generators downwardly from 5 volts, e.g. to 3 volts, 2.5 volts and even to 2 volts. It has been found, however, that conventional DTMF generator architecture is not capable of operating properly at such a low voltage.

SUMMARY OF THE INVENTION

The present invention is therefor directed to the provision of a DTMF generator that eliminates the above disadvantages of conventional systems.

In accordance with the invention, a Dual-Tone Multi-Frequency (DTMF) Generator includes a circuit for producing row and column tone frequency signals for application to the inputs of two source follower buffer stages. The outputs of the buffers stages are combined in a summation operational amplifier to generate the DTMF Signal. There is a voltage level shift between the input and output terminal of the source followers that is compensated with a self-compensated circuit. With a perfect match between the compensated signal and the source follower, the operational range of working voltages can be from about 1.8V to 5V, and the circuit can tolerate threshold voltage variation of the transistors.

In an alternative embodiment of the invention, emitter follower circuits may be employed in place of the source follower circuits.

BRIEF DESCRIPTION OF THE DRAWINGS

In order that the invention may be more clearly understood, it will now be disclosed in greater detail with reference to the drawings, wherein.

DETAILED DESCRIPTION OF THE INVENTION

Figure 1:
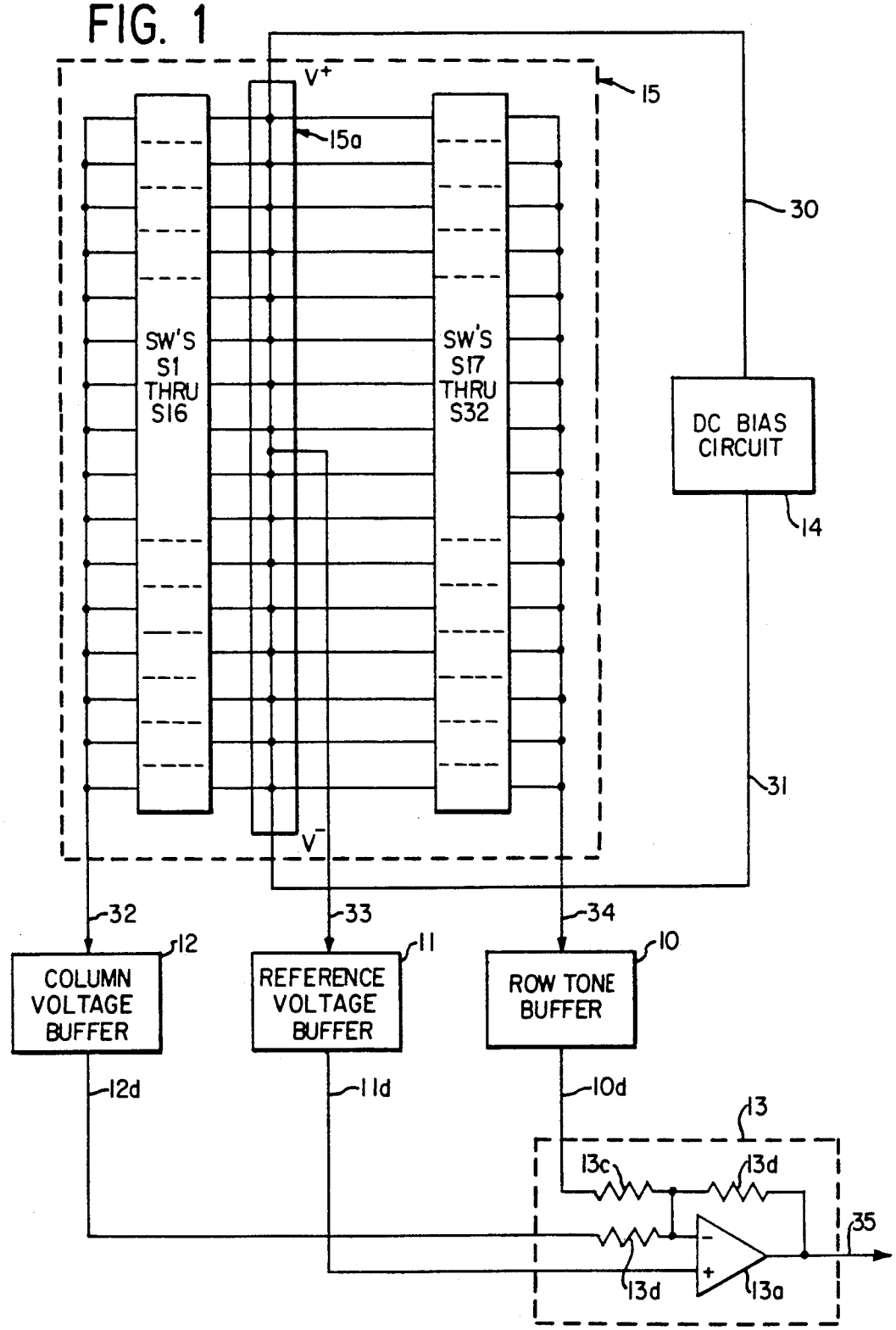
FIG. 1 is a block diagram of a DTMF generator in accordance with the invention.

FIG. 1 is a block diagram of the DTMF signal generator circuit in accordance with the invention. Circuit 14 is a DC-Bias circuit providing the voltages voltage V+ and V− at its output terminals 30 and 31. Examples of this circuit will be described with reference to FIGS. 3A-3F. Circuit 15 is a known sine wave generator with peak voltage V+ and V−. Circuit 15a is a voltage divider resistor, having its taps arranged appropriately in conventional manner to provide the desired ratios for outputting a sine wave signal. The switches S1-S16 are connected to sample the voltages at the taps of the voltage divider and apply a column tone sine wave signal to the output terminal 32. These switches, as well as switches S17-S32, are controlled in conventional manner to develop the sine wave signal.

The circuit 15a is comprised of a resistor divided into 16 segments which can be designated as Ri (i=1, 2, 3, ... 16) respectively. A sine wave period is divided into 16 equal time intervals and the sine value sampled during each time interval is designated as Vi (i=1, 2, 3, ... 16) respectively. The resistors are selected so that the ratio of the resistance between segments is:

$$\frac{Vi}{V_{i+1}} = \frac{Ri}{V_{i+1}}$$

The switches S1-S16 and S17-S32 are connected to the taps of the resistor in order to sample the sine voltage value. The controller of the switches allows only one of the respective 16 switches to be on at any instant, each switch being on for the same period of time. A sine wave is generated in this manner at the terminal 32. The switches S17-S32 are controlled in a similar manner to generate another sine wave at the terminal 34. By controlling the length of the sampling time, the switches S1-S16 and S17-S32 generate sine waves of different frequencies which represent the row and column frequencies, respectively.

Terminal 32 is connected to the column voltage buffer 12. Similarly, the switches S17-S32 are connected to sample the voltages at the taps of the voltage divider and apply a row tone sine wave signal to the output terminal 34. The terminal 34 is connected to the row tone buffer 10. The output terminal 33 is connected to a reference point of the voltage divider, and supplies the reference voltage (V++V−)/2 to the reference buffer circuit 11. Circuits 10, 11, 12 are thus voltage buffer stages for the column tone, reference voltage and row tone respectively. These buffer stages are connected to apply their output currents to the summation circuit 13 for summing the row tone and column tone so as to produce the DTMF signal output from the output terminal 35.

Figure 2A:
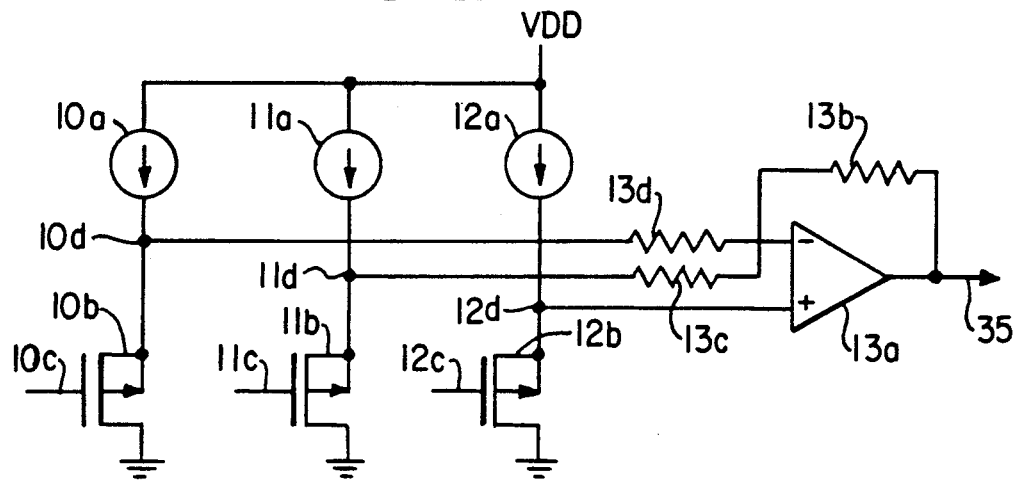
FIG. 2A is a schematic diagram of the column buffer, row buffer and reference voltage buffer of the circuit of FIG. 1, employing PMOS source follower circuits.

FIGS. 2A-2D illustrate four circuit arrangements that may be employed for the buffer circuits 10, 11, 12, of FIG. 1. In FIG. 2A, constant current sources 10a, 11a, 12a are current supplies for the PMOS source follow circuits 10b, 11b, and 12b respectively. Terminals 10c, 11c are the column and row tone input signal terminals, and terminal 12c is the input terminal for the reference voltage (V++V−)/2. Since there is a voltage level shift between the gate and source of the source followers, it is necessary for the voltage reference to be shifted to the same extent as the row tone and column tone, and the PMOS voltage source follower 12b is used for this purpose. The PMOS transistor 12b and the PMOS transistors 10b and 11b must thus not only have the same size but they must also be symmetrical. In the PMOS source follower of FIG. 2A, the voltage level is shifted up from the levels of terminals 10c, 11c, 12c to the levels of terminals 10d, 11d, 12d by the voltage |VGs|.

Figure 2B:
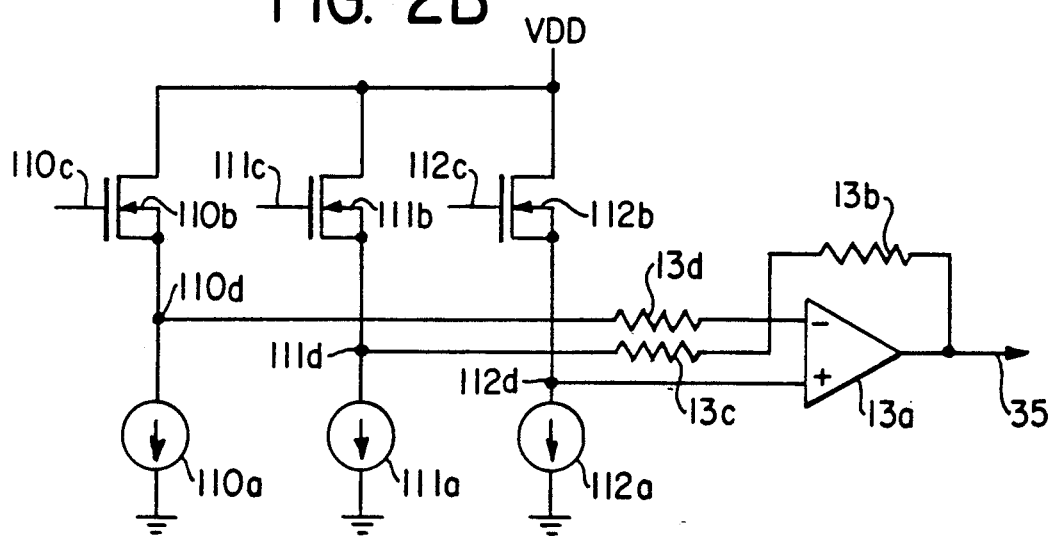
FIG. 2B is a schematic diagram of a column buffer, row buffer and reference voltage buffer of the circuit of FIG. 1, employing NMOS source follower circuits.

In FIG. 2B the constant current sources 110a, 111a, 112a are current sinks for the NMOS source followers 110b, 111b and 112b, and the voltage level is shifted down by the voltage |VGs|, from the voltages at terminals 110c, 111c, 112c to the voltages at junctions 110d, 111d and 112d respectively.

Figure 2C:
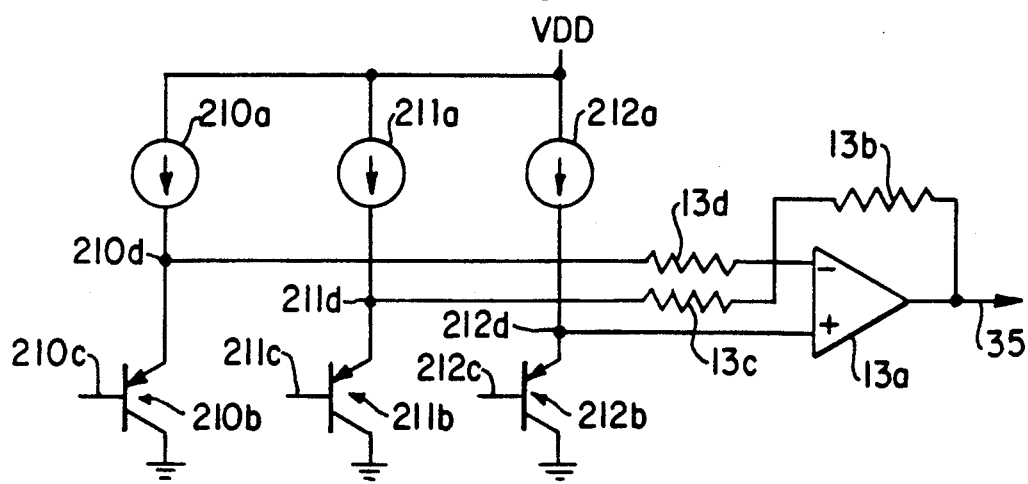
FIG. 2C is a schematic diagram of a column buffer, row buffer and reference voltage buffer of the circuit of FIG. 1, employing PNP transistor emitter follower circuits.
Figure 2D:
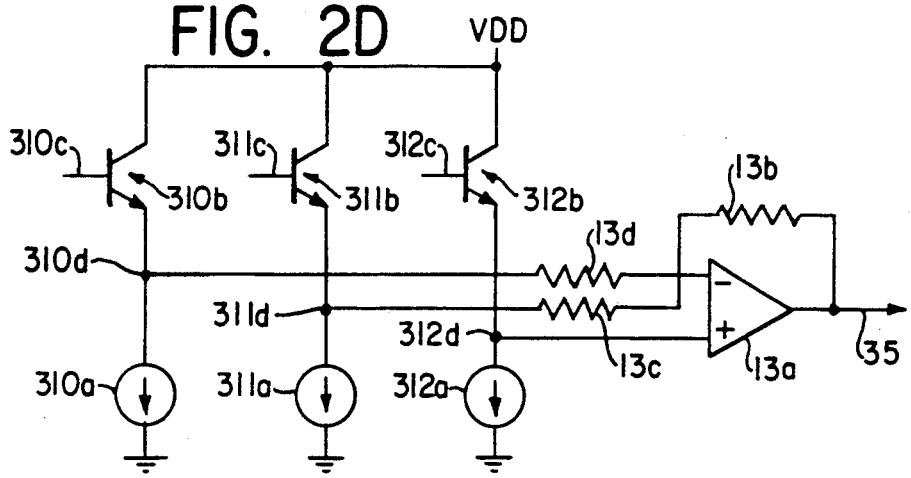
FIG. 2D is a schematic diagram of a column buffer, row buffer and reference voltage buffer of the circuit of FIG. 1, employing NPN transistor emitter follower circuits.

The substitution of the PMOS and NMOS transistors of FIGS. 2A and 2B with PNP transistors and NPN transistors results in the circuits of FIGS. 2C and 2D respectively, wherein the corresponding elements are prefixed by "2" and "3" respectively. The directions of voltage level shift between the terminals is the same in the circuit of FIG. 2C as in the circuit of FIG. 2A, and is the same in the circuit of FIG. 2D as in the circuit of FIG. 2B. The voltage shift values, however, are the base-emitter junction drops of the PNP transistors 210b, 211b and 212b and NPN-transistors 310b, 311b and 313b. The circuits of FIGS. 2A and 2B have an advantage that there is a very high input impedance at the respective input terminals. The circuits of FIGS. 2C and 2D, using bipolar transistors, provide a more precise voltage level between the transistor terminals and the value of Vbe.

Figure 4:
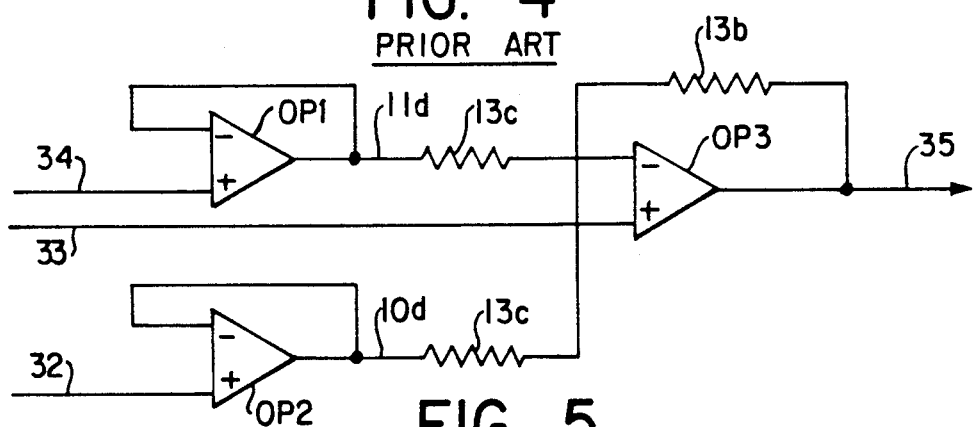
FIG. 4 is a block diagram illustrating a prior art column tone buffer, row tone buffer and summation output stage.
Figure 5:
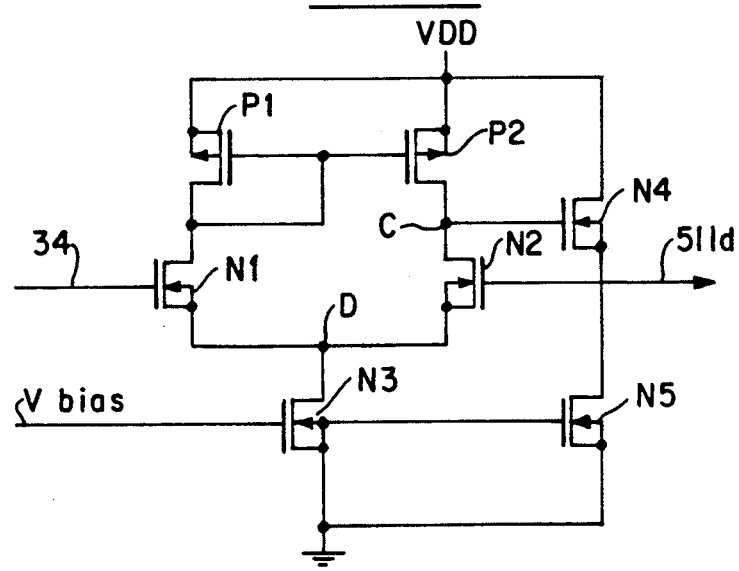
FIG. 5 is a schematic illustration of the circuit details of the prior art column tone or row tone operational amplifier buffer stages of FIG. 4.

FIG. 4. illustrates a prior art column tone buffer circuit OP1, a row tone buffer circuit OP2, and a summation circuit OP3. Column tone signals and row tone signals are input from the terminals 32 and 34, and the DTMF signal is generated by the circuit OP3 for output from terminal 35. Terminal 33 is the input terminal for supplying the reference voltage of the operating point of the circuit of FIG. 4. In the circuit of FIG. 4, when the power supply voltage is below 2V, the linear range operation of the circuits OP1 and OP2 is clipped by the threshold voltage of the MOS transistors of the circuits. The reason for this effect is as follows:

FIG. 5. illustrates the circuit of a column or row tone buffer stage operational amplifier voltage follower structure used in the prior art. Terminal 34 is the tone input point, terminal 511d is the output terminal of the voltage follower buffer stage, and terminal Vbias is the input terminal for supplying the DC bias voltage for the operational amplifier. Terminal 511d is connected to the source point of NMOS N4 and the gate point of NMOS N2, since in the normal operation of the operational amplifier all MOS transistors in the circuit must be operated in the saturated range. Therefore terminal 511d must have an NMOS threshold voltage drop from terminal C and an NMOS threshold voltage drop to terminal D. Since the maximum voltage of the terminal C is VDD and the minimum voltage of the terminal D is grounded, the voltage range of the terminal 11d is:

$$|Vth| \leq V511d \leq VDD - |Vth|$$

For the voltage follower connection structure in FIG. 5, the voltage of the terminal 34 is equal to the voltage of the terminal 511d. In other words the input terminal voltage range must be Vth≤V34≤VDD−Vth, so the operational amplifier can be operated normally. Since the threshold voltage of an MOS transistor is a parameter that varies with the semiconductor process, it is possible for the threshold voltage to be 1 volt. If the power supply voltage VDD is below 2 volts, then there is no dynamic range for the input terminal 34.

In the circuit of FIG. 2A, however, the dynamic range of the voltage of terminal 10c, 11c, 12c only has the upper limiting voltage VDD−Vth. With the appropriate adjustment of the input voltage range to the terminal 10c, 11c, 12c, the circuit in FIG. 2A can work normally with the power supply VDD below 2V. The dynamic ranges of the circuits of FIGS. 2B, 2C, 2D are Vth≤V110c, V111c, V112c≤VDD, 0≤V210c, V211c, V212c≤VDD−Vbe and VBE≤V310c, V311c, V312c≤VDD respectively.

Circuit 13 in FIG. 1 is used as a summation circuit. Considering its dynamic range at terminal 35, when the power supply voltage is lower, it is reasonable that the DC level at terminal 35 be set at VDD/2 for the balanced division of the dynamic range at the terminal, so that the voltage at terminal 12d must be biased at VDD/2, Circuits 11, 111, 211 and 311 in FIG. 2A, 2B, 2C, 2D are the source follower or emitter follower circuits, under the condition that terminal 12d, 112d, 212d 312d is biased at VDD/12. The terminal 12c must be biased at VDD/2+Vth or VDD/2+Vbe. In FIG. 1, circuit 14 is a DC bias circuit for generating a DC bias voltage for the circuit 15, in order to make the voltage level meet the requirements of the circuits 10, 11, 12.

Figure 3A:
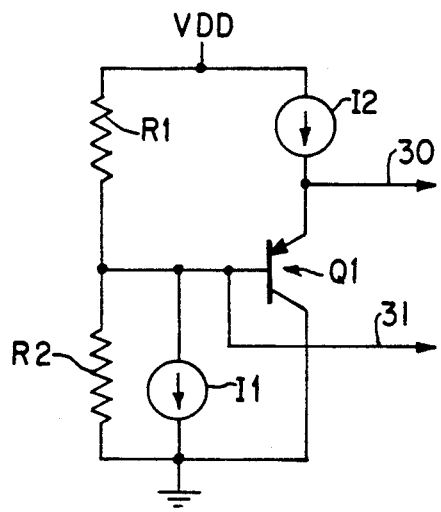
FIG. 3A illustrates a prior art DC bias circuit.
Figure 3B:
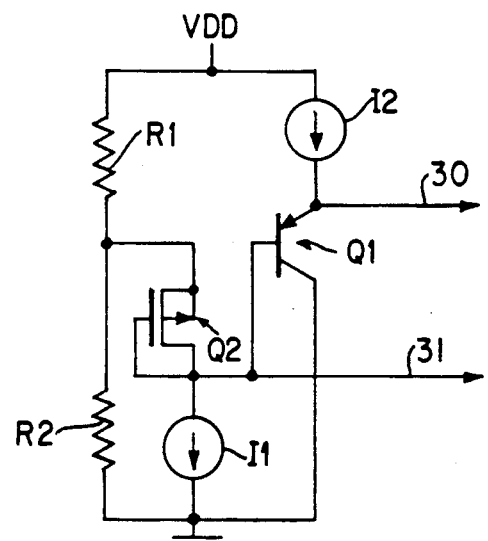
FIG. 3B illustrates a DC bias circuit in accordance with the invention, with the voltage level shifted down by the amount of $|Vgs|$ of the PMOS.
Figure 3C:
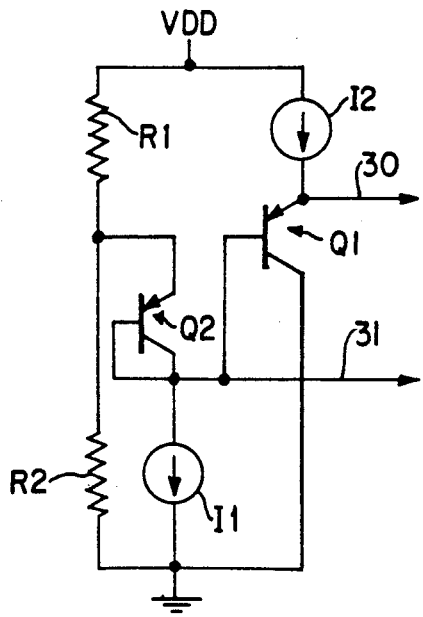
FIG. 3C illustrates a DC bias circuit in accordance with the invention, with the voltage level shifted down by the amount of Vbe of the PNP transistor.
Figure 3D:
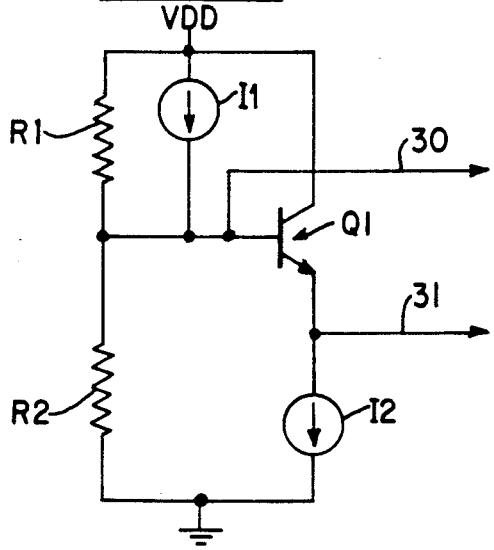
FIG. 3D illustrates another prior art DC bias circuit.
Figure 3E:
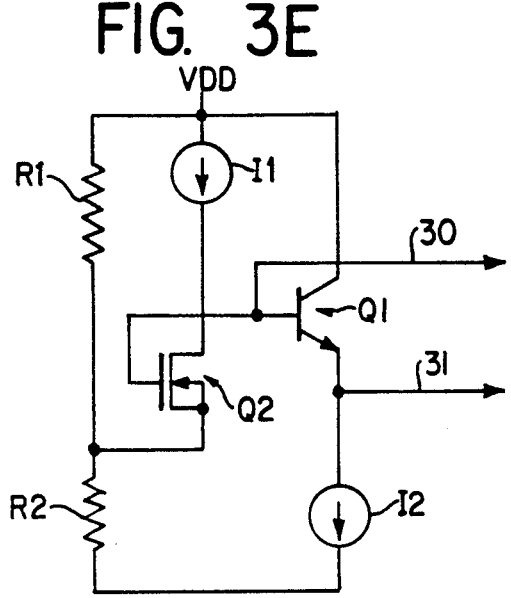
FIG. 3E illustrates a DC bias circuit in accordance with the invention, with the voltage level shifted up by the amount of $|Vgs|$ of the NMOS.
Figure 3F:
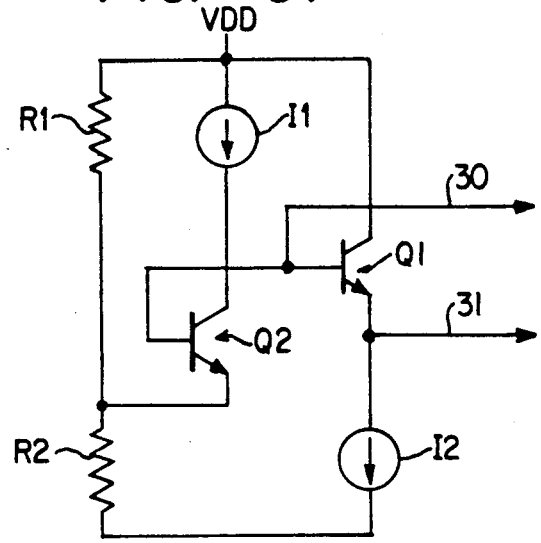
FIG. 3F illustrates a DC bias circuit in accordance with the invention, with the voltage level shifted up by the amount of Vbe of the NPN transistor.

FIGS. 3A, 3B, 3C, 3D, 3E, 3F are DC Bias circuits for generating the voltage V+ and V− for circuit 15 in FIG. 1, and the resistances R1=R2=R. If the base current of bipolar transistor Q1 is neglected in comparison with the constant current source I1, then the voltage at the terminal 31 of FIGS. 3A, 3B, 3C are VDD/2−I1 R/2, VDD/231 I1 R/2−|VTH|, VDD/2−I1 R/2−|VBE| and at the terminal 30 of FIGS. 3D, 3E, 3F are VDD/2+I1R/2, VDD/2+I1R/2+|VTH| and VDD/2+I1 R/2+|VBE| respectively. The terminals 30 and 31 are used as V+ and V− in the FIG. 1.

The bipolar transistor Q1 base-emitter junction voltage drop is used to make the voltage drop from terminal 30 to terminal 31, and at terminal 30 the V+ voltage is generated for the circuit of FIG. 1. The advantage of the use of this circuit is that the voltage difference between V+ and V− is independent of the power supply voltage VDD. If the voltage component I1 R/2 is chosen to have the same value as (V+ −V−)/2, then the average voltage value between terminal 30 and 31 of FIGS. 3A, 3D is VDD/2, which is satisfied by the needs of the prior art circuit in FIG. 4. The present invention is more suitable for the low power supply VDD, the difference as compared with the prior art being that, with the use of source follower or emitter follower, there is voltage difference with a value Vth or Vbe between the source follower or emitter follower stage with the operational amplifier of circuit 13a. For the DC level of terminal 35 to be biased at the value of VDD/2, it is necessary that the input signal DC level of the input terminals of FIG. 2A, 2C be dropped with the voltage of Vth or Vbe from VDD/2. FIG. 3B and FIG. 3C use the transistor Q2 to generate the voltage drop Vth or Vbe at terminal 30 and 31, such that the DC level at terminals 32, 33, 34 of FIG. 1 drop by the amount Vth or Vbe from VDD/2. With the use of PMOS transistors or bipolar PNP transistors, the voltage rise of the source followers or emitter followers of FIG. 2A, 2C are self compensated by the PMOS or PNP transistor in FIG. 3B, 3E and which is independent of the semiconductor process variation of the device parameters. If the circuits of FIG. 2B or FIG. 2D are used, it is necessary that the voltage at the input terminals be VDD/2+Vth or VDD/2+Vbe, so that, with the use of circuits of FIG. 3E and FIG. 3F, the Vth and Vbe can be self compensated.

In FIG. 1, if V+ and V− are to biased at voltage higher than VDD/2 or lower than VDD/2, a different circuit can be employed for the circuit 14. If V+ and V− are greater than VDD/2, then it is advantageous to employ PMOS devices for the switches S1 to S32, for lower transistor impedance between drain and source. If V+ and V− are less than VDD/2, then it is advantageous to employ NMOS devices for the switches S1 to S32 are, for the lower impedance.

While the invention has been disclosed with reference to a limited number of embodiments, it will be apparent that variations and modifications may be made therein, and it is therefore intended in the following claims to cover each such variation and modification as falls within the true spirit and scope of the invention.

What is claimed is:

1. A self-compensated dual tone multiple frequency (DTMF) generator, comprising:
    (1) a DC voltage shift-down bias generator circuit having first and second voltage terminals;
    (2) a voltage divider connected between the first and second voltage terminals;
    (3) a plurality of row voltage sampling switches having first terminals connected to separate outputs of said voltage divider and second terminals connected together and to a row tone output terminal;
    (4) a plurality of column sampling switches having first terminals connected to separate outputs of said voltage divider and second terminals connected together and to a column tone output terminal;
    (5) a row tone level-shift-up buffer follower stage having an input terminal connected to the row tone output terminal;
    (6) a column tone level shift-up buffer follower stage having an input terminal connected to the column tone output terminal;
    (7) a reference voltage level-shift-up buffer follower stage having an input terminal connected to a determined output of said voltage divider resistor;
    (8) a summation operational amplifier connected to output terminals of each of the buffer follower stages for adding the outputs of the row tone level-shift-up buffer follower and the column tone level-shift-up buffer follower and for offsetting the adding of the outputs by the output from the reference voltage level-shift-up buffer stage to generate a dual tone multiple frequency signal; and
    (9) means for compensating for a voltage level shift between input and output terminals of each of said buffer follower stages, said compensating means being part of said DC voltage shift-down bias generator circuit so that said circuit self-compensates.

2. The generator of claim 1, wherein said compensating means includes a PMOS transistor for shifting down a voltage level.

3. The generator of claim 1, wherein said compensating means includes a PNP transistor for shifting down a voltage level.

4. The generator of claim 1, wherein said switches are NMOS devices.

5. The generator of claim 1, wherein said follower stages are PMOS source follower stages.

6. The generator of claim 1, wherein said follower stages are PNP emitter follower stages.

7. A self-compensated dual tone multiple frequency generator, comprising:
    (1) a DC voltage shift-up bias generator circuit having first and second voltage terminals;
    (2) a voltage divider connected between the first and second voltage terminals;
    (3) a plurality of row voltage sampling switches having first terminals connected to separate outputs of said voltage divider and second terminals connected together and to a row tone output terminal;
    (4) a plurality of column sampling switches having first terminals connected to separate outputs of said voltage divider and second terminals connected together and to a column tone output terminal;
    (5) a row tone level-shift-down buffer follower stage having an input terminal connected to the row tone output terminal;
    (6) a column tone level-shift-down buffer follower stage having an input terminal connected to the column tone output terminal;
    (7) a reference voltage level-shift-down buffer follower stage having an input terminal connected to a determined output of said voltage divider resistor;
    (8) a summation operational amplifier connected to outputs of each of the buffer follower stages for adding the outputs of the row tone level-shift-down buffer follower and the column tone level-shift-down buffer follower and for offsetting the adding of the outputs by the output from the reference level-shift-down buffer follower stage to generate a dual tone multiple frequency signal; and
    (9) means for compensating for a voltage level shift between input and output terminals of each of said buffer follower stages, said compensating means being part of said self-compensated DC voltage shift-up bias generator circuit so that said circuit self-compensates.

8. The generator of claim 7, wherein said compensating means includes an NMOS transistor for shifting up a voltage level.

9. The generator of claim 7, wherein said compensating means includes an NPN transistor for shifting up a voltage level.

10. The generator of claim 7, wherein said switches are PMOS switches.

11. The generator of claim 7, wherein said follower stages are NMOS source followers.

12. The generator of claim 7, wherein said follower stages are NPN emitter followers.

* * * * *